(12) United States Patent
Petruzelli

(10) Patent No.: US 7,661,258 B1
(45) Date of Patent: Feb. 16, 2010

(54) RAKE SYSTEM

(76) Inventor: Rocco Petruzelli, 2 Lady Godiva Way, New City, NY (US) 10956

(*) Notice: Subject to any disclaimer, the term of this patent is extended or adjusted under 35 U.S.C. 154(b) by 0 days.

(21) Appl. No.: 12/283,346

(22) Filed: Sep. 12, 2008

(51) Int. Cl.
*A01D 7/10* (2006.01)
(52) U.S. Cl. .................................. 56/400.12
(58) Field of Classification Search ............ 56/400.01, 56/400.04, 400.12; 294/50.5–50.9, 1.3, 1.4, 294/51, 118; 111/101, 106
See application file for complete search history.

(56) References Cited

U.S. PATENT DOCUMENTS

| | | | |
|---|---|---|---|
| 3,692,347 A * | 9/1972 | Bixler | 294/50.8 |
| 4,037,397 A * | 7/1977 | Fiorentino | 56/400.12 |
| 4,292,794 A | 10/1981 | Gascon | |
| 4,477,114 A * | 10/1984 | Callis | 294/50.6 |
| 4,545,189 A | 10/1985 | Nelson | |
| 4,996,834 A * | 3/1991 | Geist | 56/400.17 |
| 5,114,199 A * | 5/1992 | Newcomer | 294/50.8 |
| 5,459,988 A | 10/1995 | Glaser | |
| 5,564,266 A | 10/1996 | Laughlin | |
| D384,865 S | 10/1997 | Baran | |
| 5,901,540 A | 5/1999 | Vella | |
| 6,120,073 A | 9/2000 | Jones | |
| 6,336,314 B1 | 1/2002 | Crevier | |
| 6,502,381 B2 | 1/2003 | Crites | |
| 6,886,319 B2 | 5/2005 | Nam | |
| D506,112 S | 6/2005 | Roberson | |
| 6,901,733 B2 | 6/2005 | DeSanti | |
| 6,904,743 B2 | 6/2005 | Vodinh | |
| 7,168,230 B1 | 1/2007 | Waddell | |
| 7,363,755 B1 | 4/2008 | Caneba | |
| 2005/0016153 A1 | 1/2005 | Baker | |
| 2007/0084178 A1 | 4/2007 | Stevens | |

* cited by examiner

*Primary Examiner*—Robert E Pezzuto
(74) *Attorney, Agent, or Firm*—Michael E. Zall

(57) ABSTRACT

A rake system having a pair of rake handles, each having a top and bottom and a main body with a plurality of tines projecting therefrom mounted to the bottom of the handle. The distal ends of the tines form an angle of about 45° and 60° between the ground and a longitudinal axis passing through the handles, the angle being fixedly adjustable by the user based on height and/or posture. The handles are pivotally attached to each other at a pivot point between the top and bottom ends to permit the handles to pivot the rake and gathering member toward and away from each other to permit the raking and capture of debris. Pivotally hinged struts limit the pivot action of the handles to prevent them from separating too for apart and to maintain optimum separation.

10 Claims, 3 Drawing Sheets

RAKE SYSTEM

FIELD OF THE INVENTION

This invention relates to the rake systems and cleanup devices. More particularly, the invention relates to a novel gathering and pickup tool that is biomechanically easy to use for gathering debris and subsequently grasping and picking up the debris to carry it to a disposal area.

BACKGROUND OF THE INVENTION

Very often a cleanup tasks involve a need to gather debris into piles or bunches, which are subsequently picked up and disposed of. For example, when a homeowner needs to cleanup a yard during the Fall season, there is a need to gather items such as leaves, twigs, clippings, etc., into piles or bunches. Once formed, a bunch must subsequently be lifted and disposed of—typically using a container or by being bagged.

Importantly, when using a conventional rake or broom during cleanup activities, the step of lifting bunches of gathered debris and placing them within a suitable container, involves the use of a second item or a hand/arm of the user. For example, when gathering leaves that have accumulated in a yard, an individual will often gather the leaves into bunches, and then while bending over, may grasp the leaves by sandwiching them between a rear facing surface of the rake head and the user's hand/arm. Such a process is slow, tedious, and can be quite arduous.

Accordingly, it is desirable to have a yard cleanup device, i.e., a rake system, that enables a user to both gather debris and relatively comfortably enable a user to lift the debris into a disposal container—without having to bend over.

The leaf rake is an ancient, relatively simple gardening tool of which there are many varieties with significant differences. Gardeners and landscapers who wish to maintain a well-groomed lawn will regularly cut the grass and will use these standard hand tools to gather loose grass cuttings or clippings, fallen leaves, and other unattached relatively light lawn or yard debris. Although there are alternate and modern solutions to leaf raking and subsequent removal, including leaf blowers, bag-equipped power lawn mowers, or even burning in place, these are usually either noisy, comparatively expensive, unsafe, or environmentally suspect and thus the traditional, though laborious, lawn-raking task is still in wide use.

A typical leaf rake has a straight, cylindrical, elongated, inflexible, either metallic, hard plastic or wooden handle, that is attached to a fan-type rake head usually consisting of a polypropylene or metallic plurality of teeth or tines that are inwardly curved at their edges. Although raking itself can be a difficult task due the upper body strength requirement, after the leaves are raked and gathered into piles, they still require pick up and removal. Conventional leaf rakes are well suited to raking leaves into piles, but they are generally not designed for lifting capabilities. Because of the necessary leverage for picking up and transporting the raked material, this task is usually the most difficult aspect of this largely seasonal activity and generally requires alternating use of separate pick up implements, such as a shovel and yard broom. If the proper tools are unavailable, leaf and debris pick up may involve bending over, kneeling, or stooping, then gathering and pressing the leaves or other raked material with one hand, against the rake head and tines held by the other hand.

Although those skilled in the prior art will be aware of multi-purpose rake combination devices and rake attachments, such as a rake and shovel combination, or an all-in-one pick-up rake that uses two oppositely directed rake heads for grabbing leaves and debris, and facilitating the leaf pick up task, are generally of cumbersome design, requiring costly, complex and bulky additions to the conventional rake. Furthermore, such combination rakes and rake attachments are generally not intended to accommodate complete separation into independent rakes so that two individuals may rake simultaneously and complete the task within a shorter period.

A number of U.S. patents have been granted on leaf pickup rakes. A representative sample of these U.S. patents are as follows:

U.S. Pat. No. 7,363,755 to Caneba describes a tool for gathering and picking material having two rake heads and handle units arranged side by side with both rake heads arranged in substantially the same plane for raking. The units are temporarily held in this position by several fasteners along the length of the units. One version is joined at a pivoting joint that allows each of the units to separately pivot about its own longitudinal axis so that their undersides are substantially facing each other and to swing opposite each other for picking up debris. Another version allows both units to be completely disconnected when in the pick-up mode.

U.S. Pat. No. 7,168,230 to Waddell describes an apparatus for gathering, picking up and carrying loose materials that consists of two grasping elements which each have shafts with grasping devices or heads at one end, and a coupling which joins their shafts. The coupling is flexible and can be moved along the shafts of the grasping elements to change the manner in which the elements function together.

U.S. Pat. No. 6,904,743 to Vodinh describes a device for combining two rakes to provide a combination raking and picking up apparatus that comprises a pair of sleeves pivotally attached to one another by connecting sleeves. The sleeves allows the rakes to rotate at least 180 degrees with respect to each other allowing the apparatus to be used for raking lawn debris and picking up debris.

U.S. Pat. No. 6,901,733 to DeSanti describes a debris gathering and pickup tool. The tool includes a gathering portion and a grasping portion. The gathering portion includes a flattened gathering head, an elongated handle, and a coupling arrangement for coupling the gathering head to the elongated handle at a pre-selected downward angle. Similarly, the grasping portion may include a flattened grasping member, a user operated grasping sleeve, and a second coupling arrangement establishing a downward angle between the grasping member and the grasping sleeve. The gathering portion is further structured for being slidably coupled to the gathering portion, such that the user may selectively move the grasping portion between a retracted position and a grasping position, as needed for cleanup activities.

U.S. Pat. No. 6,886,319 to Nam describes a folding rake that includes a first rake and a second rake that are releasably restrained relative to each other in a rake position and may be released and moved into a folded position. In the rake position the first and second handle portions are generally axially aligned. In the folded position the rake heads are generally adjacent to each other.

U.S. Pat. No. 6,502,381 to Crites describes a pick-up rake that has an elongate handle attached to a rake head. The rake head is pivotally attached to a grasping element that may be pivoted from a stored positioned to a closed position, the rake head remaining in contact with the ground while the grasping element moves from the stored to the closed positions. A slider element and rod cooperate to enable a user to clamp the grasping element against the rake head, thereby grasping debris therebetween and facilitating removal of the debris.

U.S. Pat. No. 6,336,314 to Crevier describes a rake having grasping features, the rake including and elongated and tubular rake handle. A main rake head is attached to the handle and an auxiliary rake head is pivotally attached spring biased to the main rake head by an auxiliary head hinge.

U.S. Pat. No. 6,120,073 to Jones describes a device for gathering and lifting leaves that utilizes a specially designed pair of leaf scoops that are pivotally secured to each other in opposing orientation via their handles.

U.S. Pat. No. 5,901,540 to Vella describes a garden tool that includes a rake and a shovel rake for picking up and placing debris into a transport container.

U.S. Pat. No. 5,459,988 to Glaser describes a quick connect rake system that includes two rakes or similar yard tools pivoted together by a quick-connect tube system.

U.S. Pat. No. 5,564,266 to Laughlin describes a pair of rakes each having an array of tines joined to a handle and the upper end of the handles pivotally connecting the handles for rotation with inside portions of said arrays of tines opposing each other. Preferably, rotation about the pivot extends approximately 180° from a fully opened condition in which the handle of each rake abuts an outer portion of the array of tines of the other rake to a fully closed condition in which an inner surface of each array of tines abuts an inner surface of the other array of tines.

U.S. Pat. No. 4,545,189 to Nelson describes an attachment to a conventional rake having a grasping head pivotally attached to a link which is pivotally attached to the rake head such that an operable clamp is formed, the grasping head being operated by a lever attached to the rake's handle. The pivotal link separates the upper portions of the two heads such that the capacity of the "grasp" is greater than that of conventional rakes with grasping apparatus.

U.S. Pat. No. 4,292,794 to Gascon describes a pick-up rake having a main rake head and an auxiliary rake head movably mounted to each other enable the rake heads to cooperatively act to grasp leaves and grass and the like.

US 2005/0016153 to Baker describes an attachment adapted to be connected to a rake adapted to cooperate with the rake head to provide an enclosure for picking up debris.

US 2007/0084178 to Stevens describes a leaf pickup tool having a stationary rake head and a movable rake head pivotally mounted to the stationary rake head with movement controlled by a spring handle slidably mounted to the rod and connected to the movable rake head by a rigid member.

U.S. D384865 to Baran and D506,112 to Roberson show tongs for picking up backyard debris.

Disclosed herein is an improved rake system that is biomechanically easy to use, can be adjusted to provide different tensions of pivoting, has a controlled arc of separation, can be locked in a single (opened or closed) position, particularly holding the tines in an intertwined position for storage of the rake, and if required can be easily separated into two functional rakes.

OBJECTS AND SUMMARY OF THE INVENTION

It is as an object of the present invention to provide a new and improved rake system that is biomechanically easier to use than known rake systems and can be adjusted by the user based on his or her height and posture.

It is another object of this invention to provide a rake system that includes in a preferred embodiment two conventional leaf rakes to provide a convenient method for both leaf and debris gathering or raking and then trouble-free pick up of such material, and effortless alternating between these tasks, thereby eliminating the need for additional tools for these separate tasks.

It is yet another object of this invention to provide a rake system that has a means for adjusting the tension for pivoting the rakes between an opened and closed position, has a controlled arc of separation, can be locked in a single (opened or closed) position, particularly for holding the tines in an intertwined position for storage of the rake, and if required can be easily separated into two functional rakes.

All of these objects are achieved by the rake system of this invention. The rake system includes a rake handle having a top end portion and a bottom end portion and a rake having a main body and a plurality of tines projecting from the main body. The main body of the rake is mounted to the bottom end portion of the rake handle. A second handle is provided that has a top end portion and a bottom end portion. A gathering member, preferably another rake, has the main body mounted to the bottom end portion of the second handle. Preferably, the distal ends of the tines form an angle of about 45° and 60° between the ground upon which the distal ends rest and a longitudinal axis passing through the handles making the rake system biomechanically easier to use. Preferably this angle can adjusted by the user based on his or her height and/or posture. The handles are pivotally attached to each other at a pivot point between the top end portions and the bottom end portions to permit the handles to pivot the rake and gathering member away from each other to form a debris receiving area between the plurality of tines and gathering member, and to permit the handles to pivot the rake and gathering member toward each other to capture the debris. The rake system is further provided with a limit means mounted to the handles between the end portions of the handles and the pivot point. The limit means is for limiting the pivot action of the handles to prevent them from separating too for apart and to maintain an optimum debris receiving area. The rake is employed for raking the debris into the debris receiving area and the gathering member is employed for moving the debris toward the rake as the rake and gathering member are pivoted toward each other, the rake and gathering member holding the debris therebetween to enable the debris to be lifted for subsequent disposal.

BRIEF DESCRIPTION OF THE DRAWINGS

Further aspects, features and advantages of the present invention will become even more apparent with reference to the following detailed description and the accompanying drawings.

The drawings are not presented to scale but are only used to illustrate the principles of the invention. In the drawings, like reference numbers indicate like elements.

DETAILED DESCRIPTION OF THE INVENTION

Figure 1:
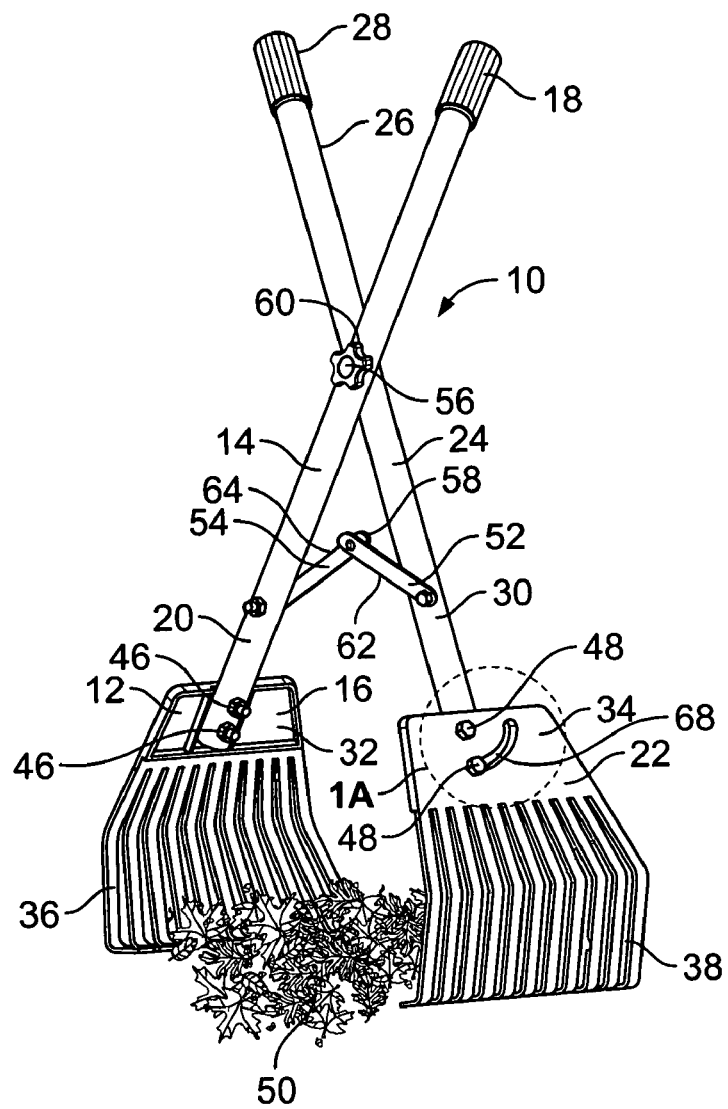
FIGS. 1 and 1A are perspective views of one embodiment of the rake type device of this invention in use, with FIG. 1A showing a magnified view of the adjustment means for adjusting the angle of the rake by the user based on his or her height and/or posture.

The term "debris" may include a large variety of items ranging from organic items such as leaves, twigs, clippings, etc., to somewhat small sized construction debris. Essentially any debris items that need to be removed or disposed of, which are gatherable and graspable with an embodiment of the present invention, are to be considered within the scope of the invention.

The expression "ground surface" may include a grassy ground surface, a dirt or stone covered area, or a concrete or paved surface. In addition, the surface from which debris are to be removed may not be flat and horizontal, and may certainly include inclined and stepped areas.

The term "flat" as applied to the preferred embodiments of the rake heads used in the invention, may be assumed to indicate a substantially planar structure, but one that may have some thickness, curvature, and other structural features associated therewith.

Other important terms and definitions will be provided, as they are needed, to properly define the present invention and its associated novel characteristics and features.

The Figures, FIGS. 1-4, illustrate an embodiment of the present invention wherein identical parts are identified with identical reference numeral.

Referring now more particularly to FIG. 1, there is shown a preferred embodiment of the rake system 10 of this invention. Rake 10 includes a first and second rake handle 14, 24, each having a top end portion 16, 18 and a bottom end portion 20, 30. Preferably, a pair of rakes 12, 22 are mounted to the bottom end portions 20, 30 of the rake handles 14, 24. In its broadest concept one of the rakes may be replaced by a flat gathering member. Grips 18, 28 are mounted to the top end portions 16, 26 of the rake handles 14, 24.

Figure 4:
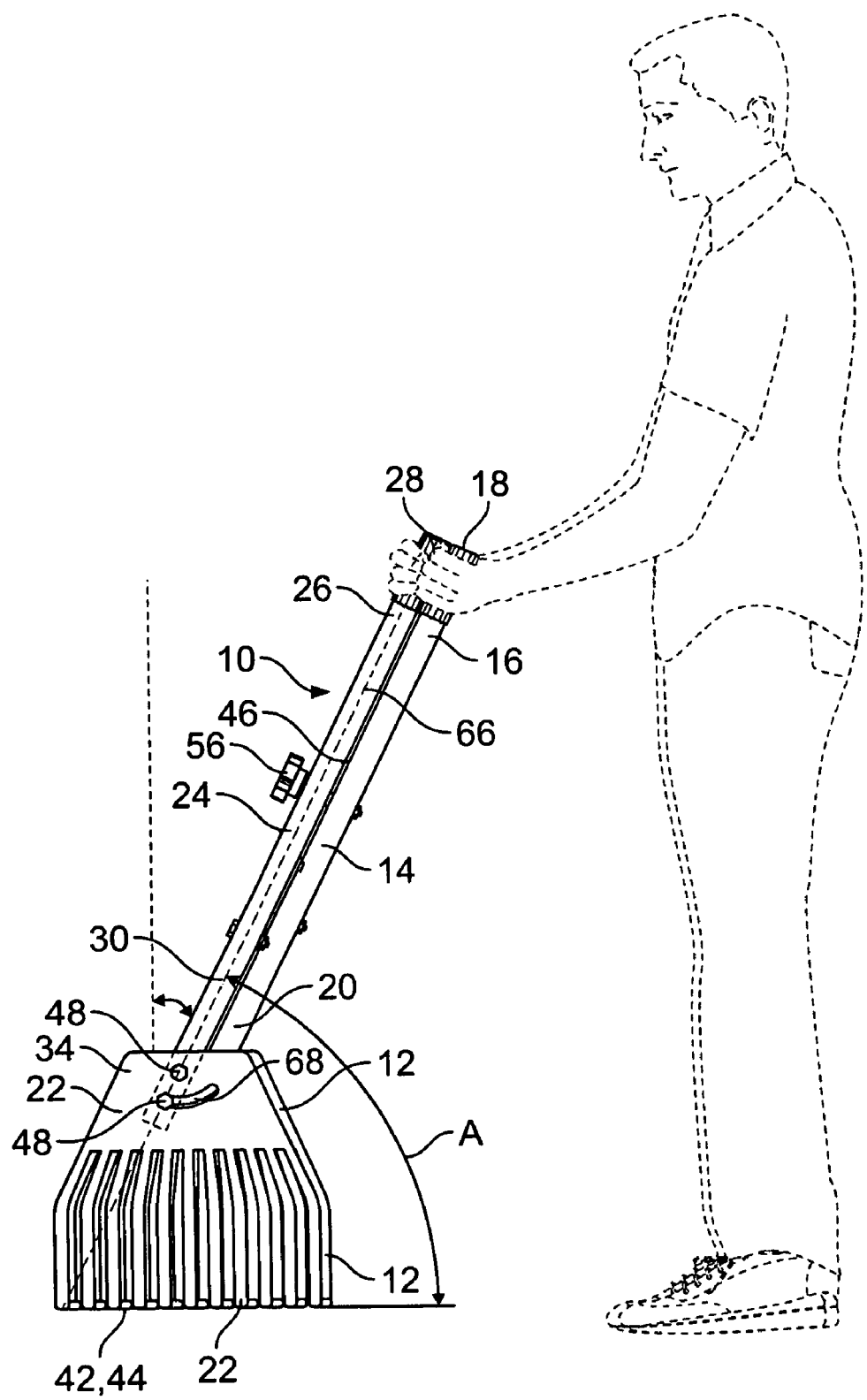
FIG. 4 is a side view of the rake type device in use by a person.

Referring to FIG. 4, each rake 12, 22 is preferably rigidly mounted to the bottom end portions 20, 30 of its respective rake handle 14, 24 at a common predetermined angle A. The angle A is defined as the angle between the ground upon which the distal end of the tines 42, 44 rest and a longitudinal axis 66 of the elongated handle 14, 24. This angle is preferably between about 45° and 60°. Such an angle makes the raking and gathering operations biomechanically easier, keeping the arms of the user at a more relaxed position than if such angle is 90° as in known rake systems.

Figure 2:
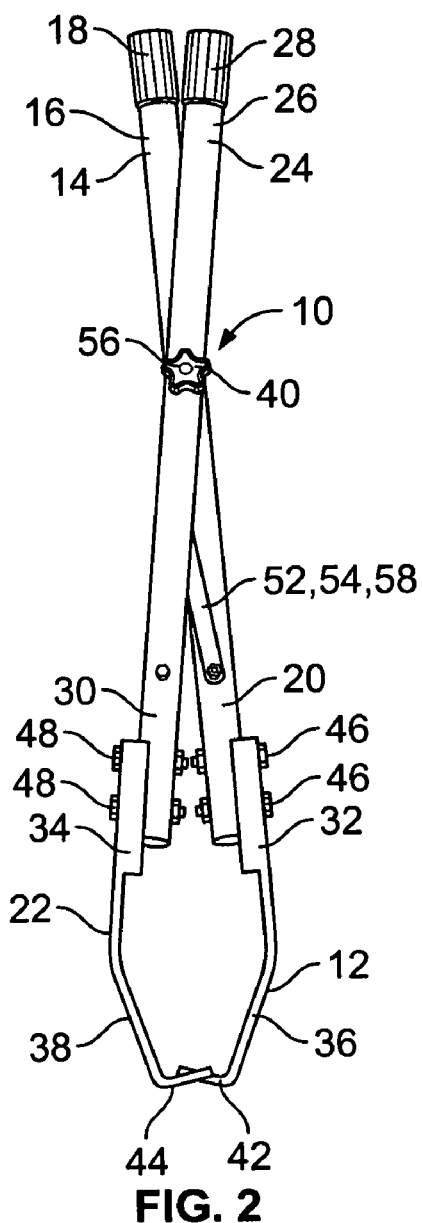
FIG. 2 is a front view of the embodiment of the rake type device depicted in FIG. 1 in the closed position.

Rakes 12, 22 each include a flat main body 32, 34 with a plurality of tines 36, 38 cantileveredly mounted thereto. The distal ends of each tine 42, 44 are bent at a right angle and extend toward the tines of the opposing rake (FIGS. 1 and 2).

The main body 32, 34 of each rake 12, 22 is fixedly mounted to the bottom end portion 20, of the respective rake handle 14, 24 and is secured thereto by any number of conventional means, such as threaded fasteners, bolts or pins 46, 48.

Figure 1A:
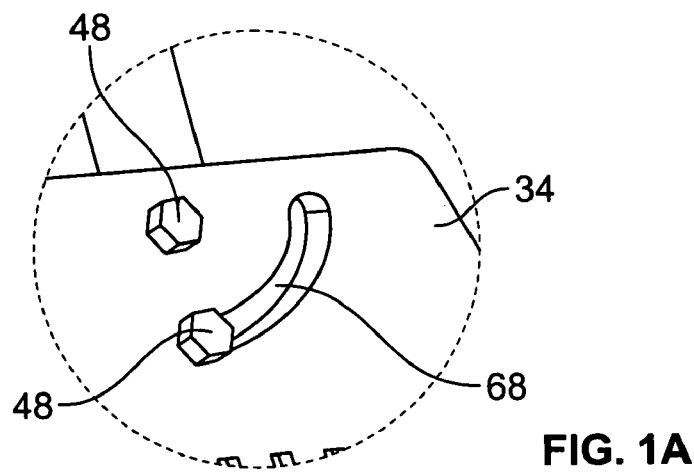

Referring to FIG. 1A, in a preferred embodiment the angle A may be adjusted by the user based on his or her height and/or posture. This is accomplished having a curvilinear slot 68 in each of the main bodies 32, 34 of each rake 12 22. To adjust the angle A the lower and upper bolts 46, 48 that hold each rake 12, 22 on its respective handle 14, 24 are loosened and the rake 12, 22 pivoted about the upper bolt to the desired angle A. The bolts are then tightened.

Rake handles 14, 24 are additionally pivotally attached to each other to facilitate rotation in a plane around a common pivot point 40. Located between the top end portions 16, 26 and the bottom end portions 20, 30 of the rake handles 14, 24 is a means for pivotally connecting the rake handles 14,24 for permitting the handles to pivot the rakes 12, 22 away from each other to form a leaf receiving area 50 between the tines 36, 38 (FIG. 1) and for pivoting the rakes 12, 22 toward each other (FIG. 2) to capture the leaves. Preferably, such means removably pivotally connects the rake handles 14, 24. In the embodiment depicted this means is comprised of a bolt and knob 56 wherein the bolt runs through each handle 14, 24 substantially parallel to the plane of the flat main bodies 32, 34 and the knob is threadably connected on the distal end of the bolt and permits the selective adjustment of the friction between the handles 14, 24 to adjust the pivoting action and permit the rakes 12, 22 to be easily taken apart or locked together. Importantly, when not in use the bolt and knob 56 can be used to lock the rakes together so that they can be easily stored (FIG. 2) This invention contemplates any type means for pivotally connecting the rake handles as described herein.

Figure 3:
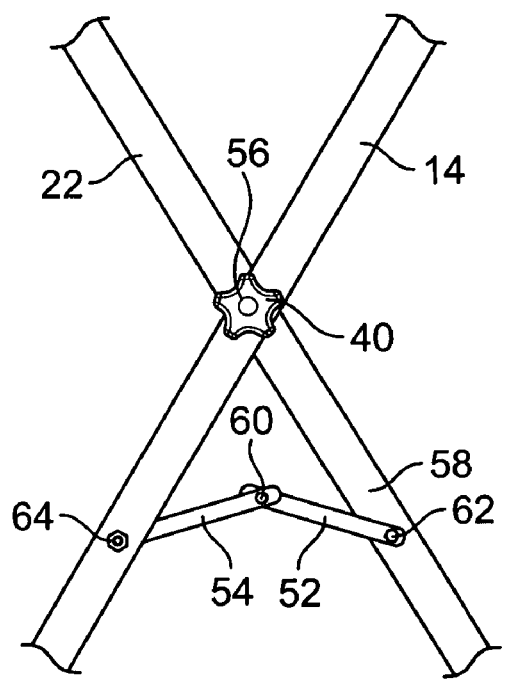
FIG. 3 is a partial front view of the embodiment of the rake type device in a partially opened position.

Referring to FIGS. 1 and 3, located between the means for pivotally connecting the rake handles 56 and the bottom end portions 20, 30 is a limit means for limiting the pivot action of the rake handles 58 to prevent them from separating too for apart and to maintain an optimum leaf receiving area 50. In the embodiment depicted, such means 58 comprises two struts 52, 54 one end of each being pivotally connected together 60 and each of the other ends 62, 64 of the struts 52, 54 are pivotally connected to a respective handle 14, 24.

In order to operate rake 10, grip handles 18, 28 are grasped and pulled apart to the open position depicted in FIG. 1 forming a leaf receiving area 50 between the distal ends of the tines 42, 44. The distance between the tines 36, 38 are limited by the limit means, e.g., pivotally connected struts 52, 54 The leaves may then be forced from the leaf receiving area 50 between the rakes 12, 22 by forcing the grip handles 18, 28 together, the struts 52, 54 folding upon themselves. The leaves will be trapped between the rakes 12, 22, the handles 18, 28 urging the rakes 12, 22 to hold the leaves therebetween. Once the leaves are trapped between the rakes 12, 22, the rake system 10 may be carried to a leaf storage area (not shown) and the grip handles 18, 28 moved apart allowing the leaves to fall from the rake system 10 into the leaf storage are. The process may then be repeated.

When the rake system 10 is no longer in use and is to be stored, the rakes 12, 22 are moved adjacent each other with the tines 36 of rake 12 offset from the tines 38 of rake 22 thereby allowing them to intertwine with each other when the rake system 10 is in the closed position as depicted in FIG. 2.

In order to use the rake system 10 to rake leaves and debris, the rake 10 is moved to the opened position depicted in FIG. 1. The rake 10 is moved across the ground with the tines of either rake 12, 22 being used to gather the leaves. Referring to FIG. 4, the rake system 10 is then be placed over the debris pile and the grip handles 18, 28 are then pulled together causing the rakes 12, 22 to close on the debris pile, with the handle 25 then being moved away from the top end 36 of the rake causing the movable rake 23 to move towards the stationary rake 22 holding the yard debris until it is ready to be released over a storage area. Additionally, the rakes may also be easily separated from each other to be used separately for raking operations.

Although not shown in the Figures, the rakes 12, 22 may be provided in a number of varying forms. For example, one of the rakes could be a broom head with broom bristles, a courser or finer rake head. It may also be noted that although illustrated as being quite planar in form, other preferred embodiments of the rake heads may be provided with curvatures, as well as other structural modifications to facilitate the functioning of the rake system.

An important benefit of the rake system of this invention is the reduction of the number of times the individual needs to bend over while cleaning a selected area, the fact that the spacing between the rakes is controlled by the means for limiting the pivot action of the rake handles, the adjustably angulated rakes all resulting in a rake system that is biomechanically easier to use than known rake systems. Yet another aspect of the invention is the use of the bolt an knob mechanism 56 which permits the rakes to be locked together by the user to maintaining the rakes 12, 22 at a user selected position, particularly for storage.

The invention has been described with reference to various specific and illustrative aspects of the present invention and techniques. However, it should be understood that many variations and modifications may be made while remaining within the spirit and scope of the invention. Many alternatives, modifications and variations will be apparent to those skilled in the art in light of the foregoing description. Accordingly, this invention is intended to embrace all such alternatives, modifications, and variations that fall within the spirit and scope of the appended claims.

What is claimed is:

1. A rake system comprising:
a rake handle having a top end portion and a bottom end portion;
a rake having a main body and a plurality of tines projecting from the main body, the main body mounted to the bottom end portion of the rake handle;
a second handle having a top end portion and a bottom end portion;
a gathering member having a main body, the main body mounted to the bottom end portion of the second handle;
the handles pivotally attached to each other at a pivot point between the top end portions and the bottom end portions to permit the handles to pivot the rake and gathering member away from each other to form a debris receiving area between the plurality of tines and gathering member, and to permit the handles to pivot the rake and gathering member toward each other to capture the debris;
a limit means mounted to the handles between the end portions of the handles and the pivot point for limiting the pivot action of the handles to prevent them from separating too for apart and to maintain an optimum debris receiving area;
wherein the limit means comprises two struts one end of each being pivotally connected together and each of the other ends of the struts pivotally connected to a respective handle at a location between the end portions of the handles and the pivot point;
wherein each of the tines of the rake has a distal end and the gathering member has a distal end, such distal ends forming an angle of about 45° and 60° between the ground upon which the distal ends rest and a longitudinal axis passing through the handles, wherein the main body of the rake and gathering member is adjustably and pivotally mounted to the bottom end portion of each handle to enable adjustment of the angle to a fixed angle between about 45° and 60°,
wherein the rake is employed for raking the debris into the debris receiving area and the gathering member is employed for moving the debris toward the rake as the rake and gathering member are pivoted toward each other, the rake and gathering member holding the debris therebetween to enable the debris to be lifted for subsequent disposal.

2. The rake system of claim 1, wherein the handles are removably and pivotally attached to each other at the pivot point.

3. The rake system of claim 2, wherein the handles are removably and pivotally attached to each other at the pivot point by a bolt having a bolt head and a threaded distal end that passes through each handle at the pivot point and a knob threadably attached to the distal end, whereby the friction between the handles may be adjusted by loosening or tightening the knob to adjust the pivoting action, to permit the rake and gathering member to be taken apart and to lock the rake and gathering member together when not in use.

4. A rake system comprising:
a first rake handle having a top end portion and a bottom end portion;
a first rake having a main body and a plurality of tines projecting from the main body,
the main body mounted to the bottom end portion of the first rake handle;
a second rake handle having a top end portion and a bottom end portion;
a second rake having a main body and a plurality of tines projecting from the main body, the main body mounted to the bottom end portion of the second rake handle;
the handles pivotally attached to each other at a pivot point between the top end portions and the bottom end portions to permit the handles to pivot the rakes away from each other to form a debris receiving area between the plurality of tines on each rake, and for pivoting the rakes toward each other to capture the debris;
a limit means mounted to the handles between the end portions of the handles and the pivot point for limiting the pivot action of the handles to prevent them from separating too for apart and to maintain an optimum debris receiving area;
wherein the limit means comprises two struts one end of each being pivotally connected together and each of the other ends of the struts pivotally connected to a respective handle at a location between the end portions of the handles and the pivot point;
wherein each of the tines of the rakes have distal ends, such distal ends forming an angle of about 45° and 60° between the ground upon which the distal ends rest and a longitudinal axis passing through the handles, wherein the main body of each of the rakes is adjustably and pivotally mounted to the bottom end portion of each handle to enable adjustment of the angle to a fixed angle between about 45° and 60°;
wherein the first rake is employed for raking the debris into the debris receiving area and the second rake is employed for moving the debris toward the first rake as the rakes are pivoted toward each other, the rakes holding the debris therebetween to enable the debris to be lifted for subsequent disposal.

5. The rake system of claim 4, wherein the handles are removably and pivotally attached to each other at the pivot point.

6. The rake system of claim 5, wherein the handles are removably and pivotally attached to each other at the pivot point by a bolt having a bolt head and a threaded distal end that passes through each handle at the pivot point and a knob threadably attached to the distal end, whereby the friction between the handles may be adjusted by loosening or tightening the knob to adjust the pivoting action, to permit the rakes to be taken apart and to lock the rakes together when not in use.

7. A rake system comprising:
a first rake handle having a top end portion and a bottom end portion;
a first rake having a main body and a plurality of tines projecting from the main body,
the main body mounted to the bottom end portion of the first rake handle;

a second rake handle having a top end portion and a bottom end portion;

a second rake having a main body and a plurality of tines projecting from the main body, the main body mounted to the bottom end portion of the second rake handle;

the handles pivotally attached to each other at a pivot point between the top end portions and the bottom end portions to permit the handles to pivot the rakes away from each other to form a debris receiving area between the plurality of tines on each rake, and to permit the handles to pivot the rakes toward each other to capture the debris;

a limit means mounted to the handles between the end portions of the handles and the pivot point for limiting the pivot action of the handles to prevent them from separating too for apart and to maintain an optimum debris receiving area;

wherein the limit means comprises two struts one end of each being pivotally connected together and each of the other ends of the struts pivotally connected to a respective handle at a location between the end portions of the handles and the pivot point;

wherein each of the tines of the rakes have distal end, such distal ends forming an angle of about 45° and 60° between the ground upon which the distal ends rest and a longitudinal axis passing through the handles, wherein the main body of each of the rakes is adjustably and pivotally mounted to the bottom end portion of each handle to enable adjustment of the angle to a fixed angle between about 45° and 60°;

wherein the first rake is employed for raking the debris into the debris receiving area and the second rake is employed for moving the debris toward the first rake as the rakes are pivoted toward each other, each of the tines of each rake meshing between two tines of the other rake to thereby hold the debris between the rakes to enable the debris to be lifted for subsequent disposal.

8. The rake system of claim 7, wherein the handles are removably and pivotally attached to each other at the pivot point.

9. The rake system of claim 8, wherein the handles are removably and pivotally attached to each other at the pivot point by a bolt having a bolt head and a threaded distal end that passes through each handle at the pivot point and a knob threadably attached to the distal end, whereby the friction between the handles may be adjusted by loosening or tightening the knob to adjust the pivoting action, to permit the rakes to be taken apart and to lock the rakes together when not in use.

10. A rake system comprising:
a first rake handle having a top end portion and a bottom end portion;

a first rake having a main body and a plurality of tines projecting from the main body, the main body mounted to the bottom end portion of the first rake handle;

a second rake handle having a top end portion and a bottom end portion;

a second rake having a main body and a plurality of tines projecting from the main body, the main body mounted to the bottom end portion of the second rake handle;

the handles pivotally attached to each other at a pivot point between the top end portions and the bottom end portions to permit the handles to pivot the rakes away from each other to form a debris receiving area between the plurality of tines on each rake, and for pivoting the rakes toward each other to capture the debris;

a limit means mounted to the handles between the end portions of the handles and the pivot point for limiting the pivot action of the handles to prevent them from separating too for apart and to maintain an optimum debris receiving area;

wherein each of the tines of the rakes have distal ends such distal ends forming an angle of about 45° and 60° between the ground upon which the distal ends rest and a longitudinal axis passing through the handles, wherein the main body of each of the rakes is adjustably and pivotally mounted to the bottom end portion of each handle to enable adjustment of the angle to a fixed angle between about 45° and 60°;

wherein the first rake is employed for raking the debris into the debris receiving area and the second rake is employed for moving the debris toward the first rake as the rakes are pivoted toward each other, the rakes holding the debris therebetween to enable the debris to be lifted for subsequent disposal.

\* \* \* \* \*